(12) United States Patent
Saphier et al.

(10) Patent No.: US 10,455,137 B2
(45) Date of Patent: Oct. 22, 2019

(54) AUTO-FOCUS SYSTEM

(71) Applicant: Orbotech Ltd., Yavne (IL)

(72) Inventors: Ofer Saphier, Rehovot (IL); Doron Malka, Tel Aviv (IL); David Fisch, Paduelle (IL)

(73) Assignee: Orbotech Ltd., Yavne (IL)

( * ) Notice: Subject to any disclaimer, the term of this patent is extended or adjusted under 35 U.S.C. 154(b) by 537 days.

(21) Appl. No.: 14/444,607

(22) Filed: Jul. 28, 2014

(65) Prior Publication Data

US 2016/0028936 A1 Jan. 28, 2016

(51) Int. Cl.
| | |
|---|---|
| H04N 5/232 | (2006.01) |
| G01S 17/08 | (2006.01) |
| G01S 17/48 | (2006.01) |
| G01S 7/481 | (2006.01) |
| G01S 7/484 | (2006.01) |
| G01S 7/486 | (2006.01) |
| G02B 7/32 | (2006.01) |
| G02B 7/10 | (2006.01) |

(52) U.S. Cl.
CPC ......... *H04N 5/23212* (2013.01); *G01S 7/481* (2013.01); *G01S 7/484* (2013.01); *G01S 7/486* (2013.01); *G01S 17/08* (2013.01); *G01S 17/48* (2013.01); *G02B 7/102* (2013.01); *G02B 7/32* (2013.01); *G01S 7/4815* (2013.01)

(58) Field of Classification Search
None
See application file for complete search history.

(56) References Cited

U.S. PATENT DOCUMENTS

| | | | |
|---|---|---|---|
| 5,136,149 A | 8/1992 | Fujiwara et al. | |
| 5,604,344 A | 2/1997 | Finarov | |
| 7,301,133 B2 | 11/2007 | Weiss | |
| 2004/0095573 A1* | 5/2004 | Tsai | G01N 21/8806 356/237.5 |
| 2004/0121474 A1* | 6/2004 | SooHoo | G01N 33/505 436/63 |

(Continued)

FOREIGN PATENT DOCUMENTS

| | | |
|---|---|---|
| CN | 101098407 A | 1/2008 |
| CN | 101556140 A | 10/2009 |

(Continued)

OTHER PUBLICATIONS

Igor S. Sidorov et al, "Distance Sensing Using Dynamic Speckles Formed by Micro-Electro-Mechanical-Systems Deflector", Optical Review, vol. 18, No. 3, 2010, pp. 161-165.

(Continued)

*Primary Examiner* — Mohammed S Rahaman
(74) *Attorney, Agent, or Firm* — Sughrue Mion, PLLC

(57) ABSTRACT

A distance measuring system is provided for auto focusing a camera of an inspection system for inspecting a planar surface that is patterned. The system includes a pattern generator, an image sensor, an optical element(s) and a processor. The pattern generator projects a spatially random pattern toward the planar surface at an oblique angle. The optical element(s) forms the image of the reflected pattern on the image sensor and the image sensor captures an image of the spatially random pattern reflected off the planar surface. The processor processes the image of the spatially random pattern and provides auto-focus information.

25 Claims, 11 Drawing Sheets

(56) References Cited

U.S. PATENT DOCUMENTS

| | | | |
|---|---|---|---|
| 2007/0145248 A1* | 6/2007 | Babayoff | G02B 21/0032 250/216 |
| 2008/0002960 A1 | 1/2008 | Ito et al. | |
| 2008/0027317 A1 | 1/2008 | Wood et al. | |
| 2008/0302974 A1 | 12/2008 | Wang et al. | |
| 2008/0316325 A1* | 12/2008 | Nakahara | G06K 9/00255 348/222.1 |
| 2009/0206284 A1 | 8/2009 | Eisen | |
| 2010/0309308 A1* | 12/2010 | Saphier | G06T 7/0004 348/92 |
| 2011/0317260 A1 | 12/2011 | Krueger | |
| 2012/0019626 A1* | 1/2012 | Hou | G01N 21/956 348/50 |
| 2013/0270464 A1 | 10/2013 | Eisen | |
| 2013/0308140 A1* | 11/2013 | Goodwin | G01B 11/14 356/615 |
| 2014/0071459 A1 | 3/2014 | Nakatsukasa | |

FOREIGN PATENT DOCUMENTS

| | | |
|---|---|---|
| CN | 101696881 A | 4/2010 |
| CN | 101910822 A | 12/2010 |
| CN | 102313976 A | 1/2012 |
| CN | 103673924 A | 3/2014 |
| CN | 103858426 A | 6/2014 |
| WO | 2009090633 A2 | 7/2009 |
| WO | 2012012265 A2 | 1/2012 |

OTHER PUBLICATIONS

J. Garcia et al, "Projection of speckle patterns for 3D sensing", Journal of Physics: Conference Series 139, 2008, pp. 1-6.

Communication dated Sep. 30, 2018 from the State Intellectual Property Office of the P.R.C. in counterpart Chinese application No. 201510387227.0.

Communication dated Aug. 29, 2018 from the Taiwanese Intellectual Property Office in counterpart Application No. 104123526.

J García et al., "Projection of speckle patterns for 3D sensing", IOP science, pp. 1-6, 2008, 8 pages total.

Communication dated Mar. 26, 2019 from the State Intellectual Property Office of the P.R.C. in counterpart Chinese application No. 201510387227.0.

\* cited by examiner

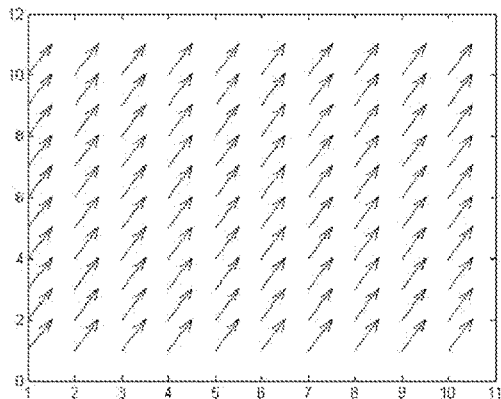
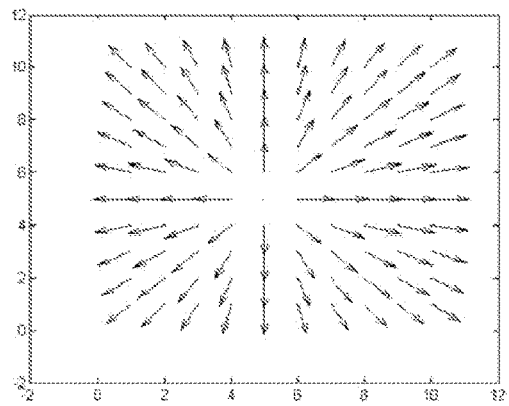
FIG. 6A   FIG. 6B
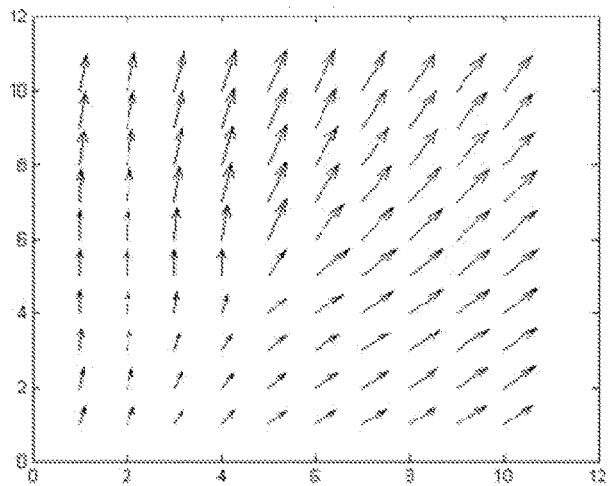
FIG. 6C

AUTO-FOCUS SYSTEM

FIELD OF THE INVENTION

The present invention, in some embodiments thereof, relates to auto-focus systems and, more particularly, but not exclusively, to auto-focus systems for use in inspection systems for electrical circuits such as printed circuit boards (PCB), wafers or other generally planar objects including patterns thereon, for example thin film transistor (TFT) panels, Flat Panel Display (FPD), and OLED panels.

BACKGROUND OF THE INVENTION

Auto-focus systems for automated optical inspection (AOI) of wafers, bare PCBs, flat panel displays (FPDs), thin film transistor (TFT) panels and also for imaging solutions for PCB production are known in the art. In these fields, relatively flat objects such as panels are inspected and/or imaged at close range with a typically small depth of field. In some automated optical inspection systems, a field of view of the camera can be as small as several hundreds of microns to several millimeters while the overall size of the panel can reach up to 2×2.5 m. In other fields, flat objects may be inspected with lower magnification and larger depth of field. The auto-focus systems are typically required to maintain accurate working distances while imaging different portions of the panel. Deviations in working distances across the panel can be due to, for example, inherent tolerances in plate thickness, tolerances in flatness of the panel and/or tolerances in the AOI system (or the like) at different locations along the supporting table.

Many known auto-focus systems use a triangulation method to adjust a working distance of a camera. Typically for triangulation, a point, a line or grid pattern is projected on the surface at an oblique angle and a camera is used to capture a specular reflection of a projected beam. Lateral displacement of the point, line or grid is sensed and a triangulation method is used to relate the detected lateral displacement to a deviation of the camera from a defined working distance. The sensed lateral displacement or detected deviation from focus provides input to an actuator for adjusting positioning of an objective lens of the camera. Sensitivity is a function of the angle of oblique illumination and size of the beam spot.

U.S. Pat. No. 5,136,149 entitled "Method of focusing optical head on object body and automatic focusing device for optical inspection system including tilt detection," the contents of which are incorporated herein by reference, describes a semiconductor wafer that is supported on a movable table mechanism. In order to maintain the surface of the wafer at the focal point of an objective lens and maintain the angle of the wafer perpendicular to the optical axis of the objective lens, a light beam is directed to the wafer. Reflected light is divided into first and second beams. The first light beam is received by a one-dimensional PSD (position sensing device), while the second light beam is received by a two-dimensional PSD. In response to respective outputs of the one-dimensional PSD and the two-dimensional PSD, the movable table mechanism is driven so as to maintain an in-focus state of the wafer and the objective lens even when the wafer is moved for scanning of respective regions on the wafer.

U.S. Pat. No. 5,604,344 entitled "Autofocussing microscope having a pattern imaging system," the contents of which are incorporated herein by reference, describes an auto-focus mechanism for a microscope including a pattern imaging system, a single image detector and a pattern focus analyzer. The pattern imaging system images at least one pattern onto an object surface through an objective lens of the microscope along a main optical path of the microscope. The image of the pattern is then combined with an image of the object and is reflected along the main optical path towards an image plane of the microscope. Use of a high contrast pattern is disclosed. The image detector detects the reflected image and the pattern focus analyzer determines sharpness of the pattern by analyzing the output of the image detector. The pattern focus analyzer can also indicate, to the apparatus for changing the distance, to move in a direction of increased focus. A direction of focus is determined by imaging two patterns at a distance $\delta$ above and below an object plane of a lens of the auto focusing apparatus and comparing focus of both patterns in the reflected image.

U.S. Pat. No. 7,301,133 entitled "Tracking auto focus system," the contents of which are incorporated herein by reference, describes a tracking auto-focus system that maintains a microscope pointed at a TFT array continuously in focus so as to eliminate the auto-focus time that would otherwise be required. The tracking auto-focus system includes, in part, a microscope Z actuator, a PSD, an analog-to-digital converter (ADC), a signal conditioner, a digital proportional integrating and differentiating (PID) controller, and a digital-to-analog converter. The PSD together with the ADC and signal conditioner continuously monitor and detect the distance between the microscope's objective lens and the target and supply the measured distance to the amplifier. The PID controller together with the DAC stabilizes the distance separating the microscope's objective lens and the target to maintain the best focus.

An article published in Journal of Physics: Conference Series 139 (2008) 012026 entitled "Projection of speckle patterns for 3D sensing," the contents of which are incorporated herein by reference, describes a use of projected speckle patterns for sensing depths and thicknesses. Different spatially random patterns are generated at different planes. Due to the speckle phenomenon, the patterns obtained at the different heights are highly random and not correlated to each other. The sensing is based on the change of the speckle pattern with propagation and the lack of correlation between speckle patterns recorded at different depths or lateral locations. The principle is used for mapping thickness of transparent media, for depth ranging and for three dimensional mapping of diffuse objects. It is found that the lack of correlation due to the speckle phenomenon will only be achieved when speckle patterns are taken at lateral or axial distances larger than the transverse or axial speckle size.

SUMMARY OF THE INVENTION

According to an aspect of some embodiments of the present invention there is provided an auto-focus system including a Distance Measurement System (DMS) that generates and/or utilizes a spatially random auto-focus pattern in place of a defined geometric auto-focus pattern, e.g. line or grid pattern that is typically projected in known triangulation auto-focus systems. According to some embodiments of the present invention, the DMS projects the spatially random pattern over an entire field of view (FOV) of the camera and/or a substantial portion of a Field of View (FOV) of the camera. Optionally, the DMS projects the spatially random pattern over an area that is larger than the FOV of the camera. According to some embodiments of the present invention, the spatially random pattern is a speckle pattern. Optionally, the DMS is operated with a camera and/or an imaging system for inspecting large planar surfaces with a small depth of focus and small field of view. Optionally, the auto-focus system including the DMS is particularly suitable for providing focus while inspecting large planar surfaces that are patterned.

An aspect of some embodiments of the present invention is the provision of a distance measuring system for auto focusing a camera of an inspection system for inspecting a planar surface that is patterned, the distance measuring system including: a pattern generator that projects a spatially random pattern toward the planar surface at an oblique angle; an image sensor that captures an image of the spatially random pattern reflected off the planar surface; at least one optical element that forms the image of the reflected pattern on the image sensor; and a processor that processes the image of the spatially random pattern captured by the image sensor and provides auto-focus information.

Optionally, the pattern generator includes a laser diode that illuminates in a light range that is other than a range used for inspecting the planar surface.

Optionally, the pattern generator includes an illuminator that provides a coherent light beam and a diffuser for generating the spatially random pattern.

Optionally, the pattern generator includes at least one lens through which the spatially random pattern is projected and wherein distance between the illuminator with the diffuser and the at least one lens is defined to yield divergence of the rays that are projected onto the planar surface.

Optionally, the pattern generator includes more than one coherent illumination source, each source generating a unique spatially random pattern.

Optionally, each coherent illumination source illuminates through a dedicated diffuser.

Optionally, each illuminator projects at a different angle.

Optionally, the pattern generator is configured to generate a speckle pattern.

Optionally, the pattern generator projects the spatially random pattern over an area larger than a field of view of the image sensor.

Optionally, the at least one optical element is the imaging optics used for capturing images of the planar surface for inspection.

Optionally, the at least one optical element includes microscope optics and wherein the pattern generator projects the spatially random pattern toward the planar surface through an objective lens of the microscope optics.

Optionally, the system includes memory for storing at least one calibration image of the spatially random pattern reflected off the planar surface, wherein the processor performs correlation between the image of the spatially random pattern and the calibration image of the spatially random pattern.

Optionally, the image sensor captures the image of the spatially random pattern in a region of interest mode.

Optionally, the image sensor switches from capturing the image of the spatially random pattern in a region of interest mode to capturing a second image for inspection of the planar surface in a full frame mode.

Optionally, the pattern generator includes a laser beam source and a holographic mask.

An aspect of some embodiments of the present invention is the provision of an auto-focus system for auto focusing a camera of an inspection system with respect to a planar surface for inspection includes: a pattern generator that generates a spatially random pattern and projects the pattern generated toward a planar surface at an oblique angle; a camera that captures an image of the spatially random pattern reflected off the planar surface; a processor that processes the image of the spatially random pattern captured by the camera and provides auto-focus information responsive to the processing; an actuator for changing a working distance between the camera and the planar surface; and a controller that controls operation of the actuator in response to the auto-focus information provided by the processor.

Optionally, the pattern generator includes a laser diode that illuminates in a light range that is other than a range used for inspecting the planar surface.

Optionally, the pattern generator includes an illuminator that provides a coherent light beam and a diffuser for generating the spatially random pattern.

Optionally, the system includes memory for storing at least one calibration image of the spatially random pattern reflected off the planar surface at a known actuator position, wherein the processor performs correlation between the image of the spatially random pattern and the calibration image of the spatially random pattern.

Optionally, the processor provides a distance and a direction toward a desired actuator position.

Optionally, the camera captures the image of the spatially random pattern in a region of interest mode.

An aspect of some embodiments of the present invention is the provision of a method for auto-focusing a camera of an inspection system with respect to a planar surface for inspection, the method including projecting a spatially random pattern at an oblique angle on the planar surface; capturing an image of the spatially random pattern reflected off the planar surface, with a camera; comparing the image with at least one calibration image captured at a known position of an actuator; determining distance and direction to a pre-defined target actuator position responsive to the comparing; and adjusting the actuator position to the target actuator position.

Optionally, the spatially random pattern is projected over an entire field of view of the camera.

Optionally, the spatially random pattern is projected over an area larger than the field of view of the camera.

Optionally, only a portion of the image is compared to the at least one calibration image.

Optionally, the comparing includes determining a translation of the spatially random pattern.

Optionally, the comparing includes determining scaling of the spatially random pattern.

Optionally, the method includes correlating the image with a plurality of calibration images, each captured at a different known position of the actuator; identifying an actuator position associated with a maximum correlation; and determining distance between the actuator position identified and the pre-defined target actuator position.

Optionally, the method includes capturing an image of the spatially random pattern during a region of interest mode of the camera.

Optionally, the method includes projecting the spatially random pattern with a light range that is other than a range used for inspecting the planar surface.

Optionally, the method includes projecting and capturing images of the spatially random pattern repeatedly as the camera is moved between defined coordinates on the planar surface; and adjusting the actuator position to the target actuator position repeatedly as required until reaching the defined detected defect region.

Optionally, the method includes alternating between projecting the spatially random pattern at an oblique angle on the planar surface and projecting illumination for inspecting the planar surface; and alternating between capturing images in a region of interest mode responsive to projecting the spatially random pattern and capturing images in a full frame mode responsive to projecting illumination for inspecting the planar surface.

Optionally, auto-focusing is performed during a scanning operation of the inspection system.

Optionally, duration for projecting the spatially random pattern is longer than duration of illumination for inspecting the planar surface.

Optionally, the method includes projecting the spatially random pattern over a first portion of a field of view of the camera; and projecting illumination for inspecting the planar surface over a second portion of the field of view, the second portion being other than the first portion; and auto-focusing the camera based on information obtained from the first portion of the field of view.

Optionally, duration for projecting the spatially random pattern is longer than duration of illumination for inspecting the planar surface.

Optionally, the method includes simultaneously projecting illumination for inspecting the planar surface and for projecting the spatially random pattern, over a common field of view; capturing an image responsive to the simultaneous projecting; and separating the spatially random pattern from a pattern included on the planar surface based on pre-defined characterizations of the spatially random pattern and the pattern included on the planar surface.

Optionally, duration for projecting the spatially random pattern is longer than duration of illumination for inspecting the planar surface.

An aspect of some embodiments of the present invention is the provision of a method for calibrating an auto-focus system for focusing a camera of an inspection system that inspects planar surfaces, the method including: recording position of an actuator for adjusting a working distance of a camera; projecting a spatially random pattern at an oblique angle on the planar surface; capturing a first image of the spatially random pattern reflected off the planar surface, with the camera; projecting illumination for capturing an image of the planar surface; capturing a second image of the planar surface, with the camera; and associating the position of an actuator with the first and second image; repeating the projecting, capturing and associating for both the first and second images and for different actuator positions; processing the images of the planar surface to determine focus quality; and identifying a target actuator position based on processing.

Optionally, the planar surface is patterned by etching or direct printing.

Optionally, the spatially random pattern is a speckle pattern.

Optionally, the method includes defining a model for determining distance and direction away from the target actuator position based on the processing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings and/or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A, 6B and 6C are exemplary graphs showing translation and/or scaling of speckle patterns due to a change in the working distance of a camera in accordance with some embodiments of the present invention;

DESCRIPTION OF SPECIFIC EMBODIMENTS OF THE INVENTION

Figure 1:
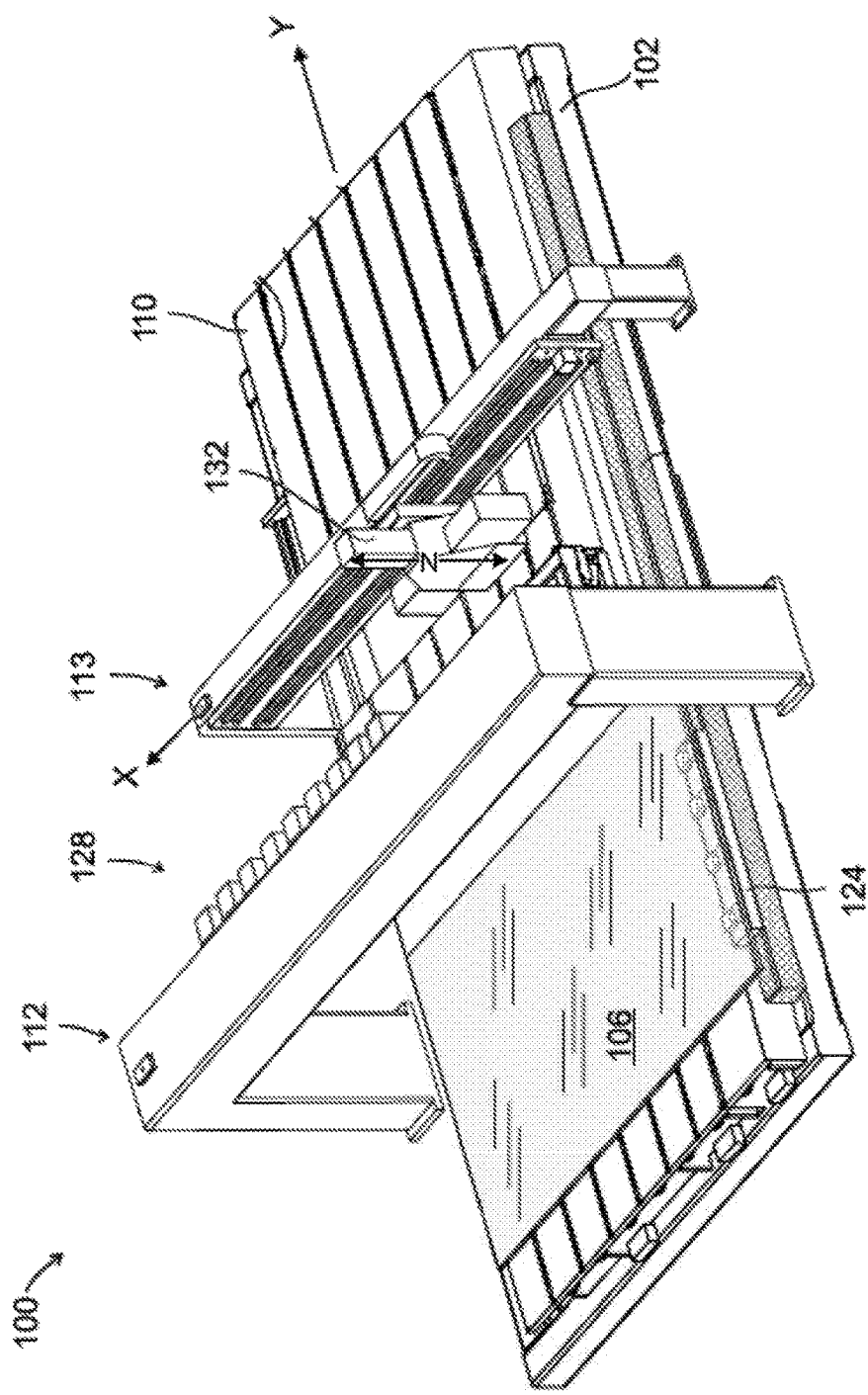
FIG. 1 is a schematic drawing of an exemplary inspection system for inspecting large planar surfaces that may be retrofitted with an auto-focus system in accordance with some exemplary embodiments of the present invention.

The present invention, in some embodiments thereof, relates to auto-focus systems and, more particularly, but not exclusively, to auto-focus systems for use in inspection systems for electrical circuits such as printed circuit boards (PCB), wafers or other generally planar objects including patterns thereon, for example thin film transistor (TFT) panels, Flat Panel Display (FPD), and OLED panels.

According to an aspect of some embodiments of the present invention there is provided a DMS that generates a spatially random auto-focus pattern and utilizes illumination and reflection of a spatially random auto-focus pattern to sense adjustments required for focusing an imaging system e.g. a camera and/or microscope camera with respect to a planar surface for inspection. According to some embodiments of the present invention, the DMS includes a auto-focus pattern generator that is operative to project the spatially random auto-focus pattern on a planar surface with oblique illumination.

In some exemplary embodiments, the spatially random auto-focus pattern is formed from a continuous pattern that includes peaks and valleys. Typically, this pattern is a speckle pattern.

According to some embodiments of the present invention, the DMS follows and/or senses shifting and/or scaling of one or more features of the random pattern, e.g. speckles in one or more directions due to changes in a working distance of the imaging system. According to an aspect of some embodiments of the present invention, the DMS is part of an auto-focus system and the auto-focus system uses output from the DMS to adjust the working distance of the imaging system for focusing.

According to some embodiments of the present invention, the DMS is suitable for focusing an imaging system with respect to a planar surface that is patterned. The present inventor has found that the DMS described herein may provide an advantage over other known DMSs when applied for focusing an imaging system with respect to a planar surface that is patterned, for example TFT panels, FPD, and OLED panels. Typically, TFT panels and the like are patterned over one or more stages with materials such as metal, indium tin oxide (ITO), crystalline silicon, and/or amorphous silicon. Typically, the patterns with these materials are geometric patterns that are typically highly correlated with geometric patterns typically used by known DMSs. The present inventor has found that a DMS can use a spatially random auto-focus pattern which is uncorrelated with the object pattern, in place of known defined geometrical auto-focus patterns to avoid confusion with the pattern etched and/or otherwise printed on the surface during auto-focusing.

In triangulation based systems, the auto-focus pattern shifts as the working distance changes (due to its oblique projection). For large deviations from a defined working distance, small patterns may fall outside the FOV. The present inventor has also found that by projecting the spatially random auto-focus pattern over a substantial portion of the FOV, over an entire FOV and/or over an area that is larger than the FOV, the likelihood of the auto-focus pattern falling outside of the FOV is significantly reduced. The present inventor has found that auto-focusing as described herein can be applied for focusing inspection systems with large deviations in working distance, without losing accuracy. Since the auto-focus pattern is projected at an oblique angle and over an extended area, different portions of the auto-focus pattern may be captured at different working distances of the imaging system. The present inventor has also found that although different portions of the auto-focus pattern may be imaged at different working distances, auto-focusing can still be provided.

In some exemplary embodiments, only a portion of the reflection of the spatially random auto-focus pattern is selected for analysis. Optionally, a portion of the reflection around a center of the FOV is selected for analysis. The present inventor has found that by illuminating a substantial area of the FOV with a spatially random auto-focus pattern and selecting a portion of the specular reflection for analysis, the accuracy required for positioning the auto-focus pattern in the optical/mechanical assembly stage, is substantially reduced and precision is maintained over a large dynamic range. According to some embodiments of the present invention, as long as positioning of the optical/mechanical parts can be stabilized in respect to one another, precision and dynamic range of the auto-focus system can be maintained.

According to some embodiments of the present invention, the spatially random auto-focus pattern used is a speckle pattern. One advantage in using a speckle pattern as an auto-focus pattern is that a speckle pattern provides stable focus over a large dynamic range of working distances and imaged area. Typically, in prior art systems, the projected auto-focus pattern will go in and out of focus for different working distances. In such a case it is important to direct the auto-focus pattern so that the best focus of the projected auto-focus pattern is accurately positioned in the best focus of the camera. The present inventor has found that when using speckle patterns, the pattern keeps relatively good focus so that it is not required to match the camera focus with the focus of the speckle pattern. Therefore precise mechanical calibration is typically not required to align a focal plane of the auto-focus pattern with a focal plane of the camera/microscope as is typically required by known DMSs.

Another advantage of using a speckle pattern for auto-focusing is that a speckle pattern that is both stable over time and over different areas of a substrate can be generated at relatively low cost. In some exemplary embodiments, a speckle pattern is generated with a diffuser and a laser beam source. Optionally, a speckle pattern is generated by projecting a laser beam through a holographic mask.

Although known methods for depth ranging using speckled pattern are known, these methods are based on lack of correlation between speckle patterns over different depths. The present inventor has found that such changes in the speckle pattern are not significant for small changes in depths in the order of magnitude of a few depths of field, but have found instead, that the speckle pattern can be used in a triangulation method for detecting shifts and/or scaling of elements of the speckle pattern. In some exemplary embodiments, shifting in more than one direction and/or scaling of the speckle pattern can occur and is detected and utilized for auto-focusing.

According to some embodiments of the present invention, when inspecting specular objects, e.g. glass, a speckle pattern or other spatially random pattern is obliquely projected, optionally through an objective lens and then reflected along the main optical path towards an image plane of the imaging system. Alternatively, the speckle pattern is reflected along an alternate optical path optionally leading to the alternate image sensor. An image detector acquires the reflected image and a processing unit analyzes shift and/or scaling of the reflected spatially random pattern to determine distance and direction from a desired and/or focused working distance. Alternatively, an image sensor dedicated to auto-focusing is used. In some exemplary embodiments, the processing unit determines correlation between the reflected images and one or more pre-stored images captured at known working distances of the imaging system. In some exemplary embodiments, convolution is used to track movement of the speckle pattern over different working distances. In some exemplary embodiments, coordinates of one or more speckle peak centers are determined and their position are tracked and/or compared with stored coordinates for defining adjustments to working distances of the camera.

In some exemplary embodiments, the auto-focus system operates in a tracking mode and maintains the imaging system continuously in focus as the imaging system moves across the substrate so as to eliminate the auto-focusing time that would otherwise be required to focus the imaging system at defined coordinates on the substrate. Typically, during a tracking mode, auto-focus images are captured as the imaging system moves toward the defined coordinates. Alternatively or additionally, auto-focusing is performed responsive to the imaging system arriving at a defined location, e.g. defect region. In some exemplary embodiments, the auto-focus system operates in a scanning mode of the inspection system. Typically, during a scanning mode, the auto-focus system performs auto-focusing at a predefined rate during motion of the imaging system. Typically, the imaging system alternates between capturing inspection images and auto-focus images. Typically, the images captured for auto-focusing both during tracking mode and scanning mode are defined to be substantially smaller than the scan images.

Optionally, the imaging system includes a microscope.

For purposes of better understanding some embodiments of the present invention, as illustrated in FIGS. 2-6 of the drawings, reference is first made to the construction and operation of an exemplary system adapted to inspect a flat panel display (FPD) for use with embodiments of the present invention as illustrated in FIG. 1. An inspection system 100 is known to be useful for the inspecting in-fabrication FPDs. Inspection system 100 includes a static levitating table 110 mounted on a chassis 102. The inspection system also includes a displacer 124 for moving the generally planar substrate 106 along a Y direction and preferably parallel to table 110. The inspection system 100 typically includes plurality of cameras 128 for scanning, e.g. a first inspection unit, mounted on a first bridge 112 spanning table 110 and connected to an image processing unit. Typically, image data captured by cameras 128 are processed on-the-fly to identify portions of the generally planar substrate 106 that may be defective. Typically, each of cameras 128 includes an auto-focus feature for adjusting focus of each of the cameras on-the-fly. Typically, each of cameras 128 is adjusted in the Z direction to maintain a desired working distance with substrate 106.

Figure 2:
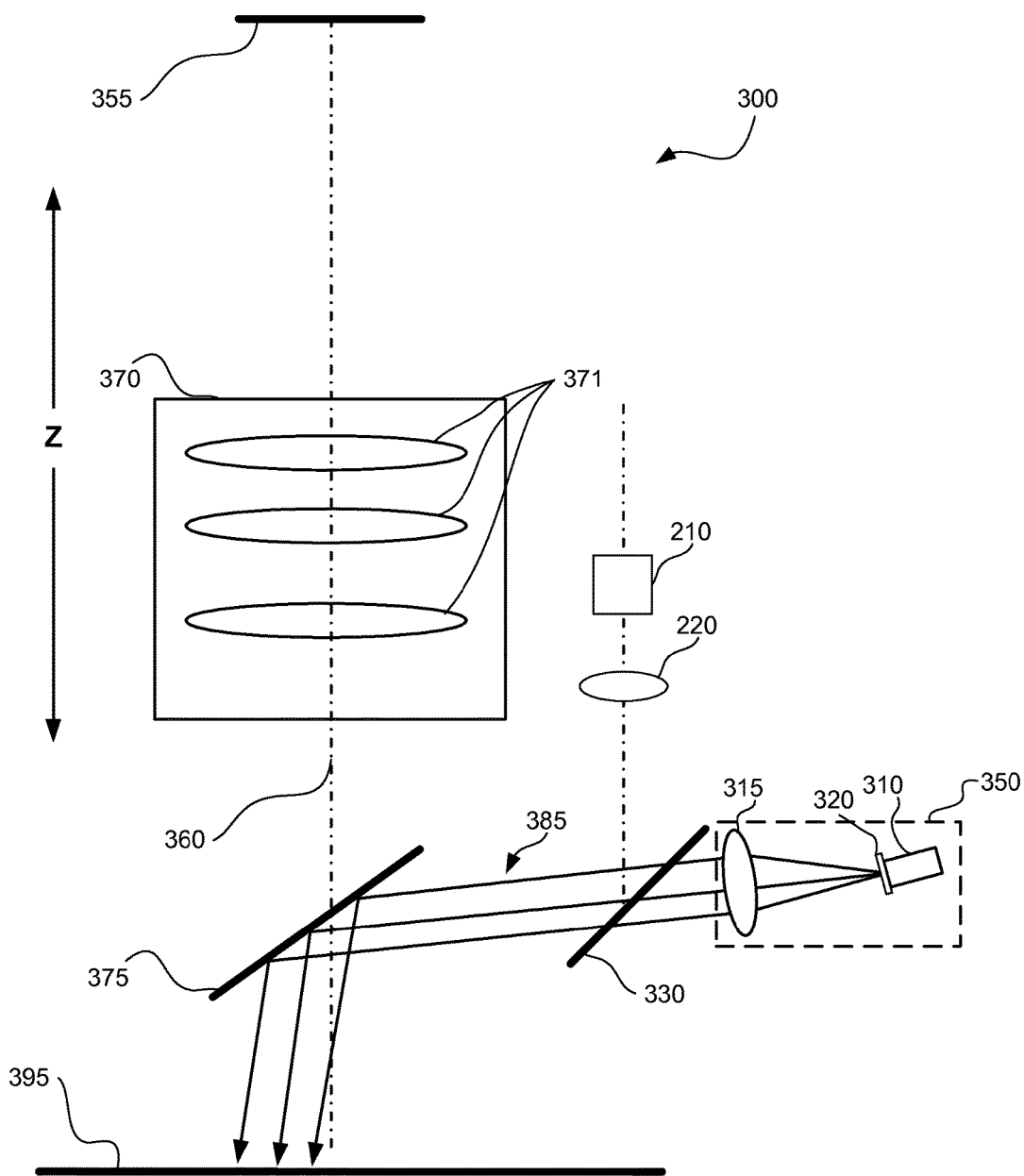
FIG. 2 is a simplified schematic illustration of an optical structure for a DMS that is integrated with camera of an inspection system in accordance with some embodiments of the present invention.

Inspection system 100 typically also includes one or more movable cameras 132, e.g. high resolution video or microscope, e.g. a second inspection unit, mounted on a second bridge 113, displaced from first bridge 112, e.g. downstream from first bridge 112, also spanning table 110, and connected to an image post processing unit for classifying the defects captured. Typically, movable camera 132 is driven back and forth in an X direction, e.g. cross-scan direction and triggered in response to inputs received from the image processing computer. Typically, the image processing computer provides information for relocating areas on planar substrate 106 which are suspected as being defective. Typically, an X axis motor and controller controls positioning of movable camera 132 on second bridge 113. Typically, camera 132 also includes an auto-focus feature for focusing camera 132 over specified defect areas of substrate 106 by moving camera 132 in the Z direction. Typically output from movable camera 132 is used for visual inspection of the defect areas, automatic defect classification and/or critical dimension and overlay (CDO) measurements of different features of the pattern. Typically, output from movable camera is processed by the image post processing computer. Reference is now made FIG. 2 showing a simplified schematic illustration of an optical structure for a DMS that is integrated with camera of an inspection system in accordance with some embodiments of the present invention. Typically, a camera 300 includes an image sensor 355, imaging optics 370 and illuminator 210. Typically, illuminator 210 illuminates in the visual light range. Optionally, one or more lens elements 220 are used for conditioning the illumination. Optionally, the illumination is directed to the target area on planar surface 395 with a beam splitter 375. Typically, illumination from illuminator 210 is reflected along main optical path 360 through imaging optics 370 toward an image sensor 355. Typically, imaging optics 370 includes one or more lenses 371. In some exemplary embodiments, a DMS is integrated with camera 300. Alternatively, illumination from illuminator 210 is reflected along an alternate optical path optionally leading to the alternate image sensor. In some exemplary embodiments, when imaging diffusive objects, e.g. PCB and/or an object that is partially diffusive and partially reflective, illumination from illuminator 210 is reflected along an alternate optical and the main optical is not used for auto-focusing.

According to some embodiments of the present invention, the DMS includes a pattern generator 350 for generating a spatially random auto-focus pattern on designated area on planar surface 395. According to some embodiments of the present invention, rays 385 from auto-focus pattern generator 350 are projected on planar surface 395 in an oblique angle so that a triangulation method can be applied to determine changes in a working distance of camera 300 based on detected shifts in the auto-focus pattern. In some exemplary embodiments, optical properties of pattern generator 350 are defined so that rays 385 are directed toward planar surface 395 in a parallel fashion. In some exemplary embodiments, the spatially random auto-focus pattern projected by rays 385 is also reflected along main optical path 360 through imaging optics 370 toward an image sensor 355, e.g. CCD or CMOS sensor. According to some embodiments of the present invention, images of the reflected auto-focus pattern are analyzed for auto-focusing. Typically, when rays 385 that hit planar surface 395 are parallel, shift in the auto-focus pattern due to changes in the working distance is substantially global, e.g. the entire auto-focus pattern shifts together in substantially the same direction and substantially by a same distance. According to some embodiments of the present invention, an actuator associated with camera 300 adjusts a working distance of camera 300 in the Z direction responsive to the analysis of one or more of the images.

In some exemplary embodiments, pattern generator 325 provides for projecting the spatially random auto-focus pattern over an entire FOV of image sensor 355 or over an area that is larger than the entire FOV. Alternatively, pattern generator 325 includes optics that provides for projecting the spatially random auto-focus pattern, e.g. speckled pattern at a specified portion of a FOV camera 300.

According to some embodiments of the present invention, pattern generator generates the auto-focus pattern with a laser diode 310 that illuminates a near infrared (NIR) range. Optionally, wavelengths below 750 µm and/or between 650 µm and 750 µm are used. According to some embodiments of the present invention, a dichroic beam splitter 330 is used to direct illumination from both illuminator 210 and pattern generator 350 to the target area on planar surface 395.

In some exemplary embodiments, camera 300 alternates between illuminating with illuminator 210 and pattern generator 350. Typically, images captured with illuminator 210 are used for inspection of the planar surface 395 and images captured with pattern generator 350 are used for auto-focusing camera 300. In other exemplary embodiments, illuminator 210 and pattern generator 350 illuminate simultaneously and auto-focusing is performed on images that are used for inspection.

Typically, when using a near IR range for pattern generator 350, the energy loss through dichotic beam splitter 330 is small and/or insignificant. It is noted that only rays 385 projected from pattern generator 350 is shown for clarity purposes. Alternatively, DMS uses dedicated imaging optics and/or image sensor, e.g. does not use imaging optics 370 and image sensor 355 for auto-focus sensing.

According to some embodiments of the present invention, pattern generator 350 generates a speckle pattern with laser diode 310, diffuser 320 and a lens 315. Optionally, lens 315 is used to customize properties of the speckle pattern generated by laser diode 310 and diffuser 320. Typically, rays coming out laser diode 310 are highly parallel when reaching diffuser 320. The present inventor has found that a speckle pattern generated with a laser and diffuser is both stable over time and stable over a FOV of camera 300 as long as properties of laser diode 310 are stable over time and the properties of the diffuser are stable over its illuminated area.

According to some embodiments of the present invention, one or more characteristics of the speckle pattern can be adjusted to obtain a desired accuracy for the DMS. Typically, a size of speckles in the speckle pattern can be adjusted by adjusting wavelength of laser diode 310, area of diffuser 320 that is illuminated by laser 310 and/or by defining properties of diffuser 320. Typically, when laser diode 310 illuminates a large part of diffuser 320, the speckle sizes are smaller. Although small speckle size may provide higher accuracy for detecting translations in the auto-focus pattern at different working distances, the magnitude of translation occurring when laser diode 310 illuminates a large part of diffuser 320 is typically smaller than the translation when laser diode 310 illuminates a smaller part of diffuser 320. Typically, the tradeoff between speckle size and speckle translation can be resolved per system type.

Figure 3:
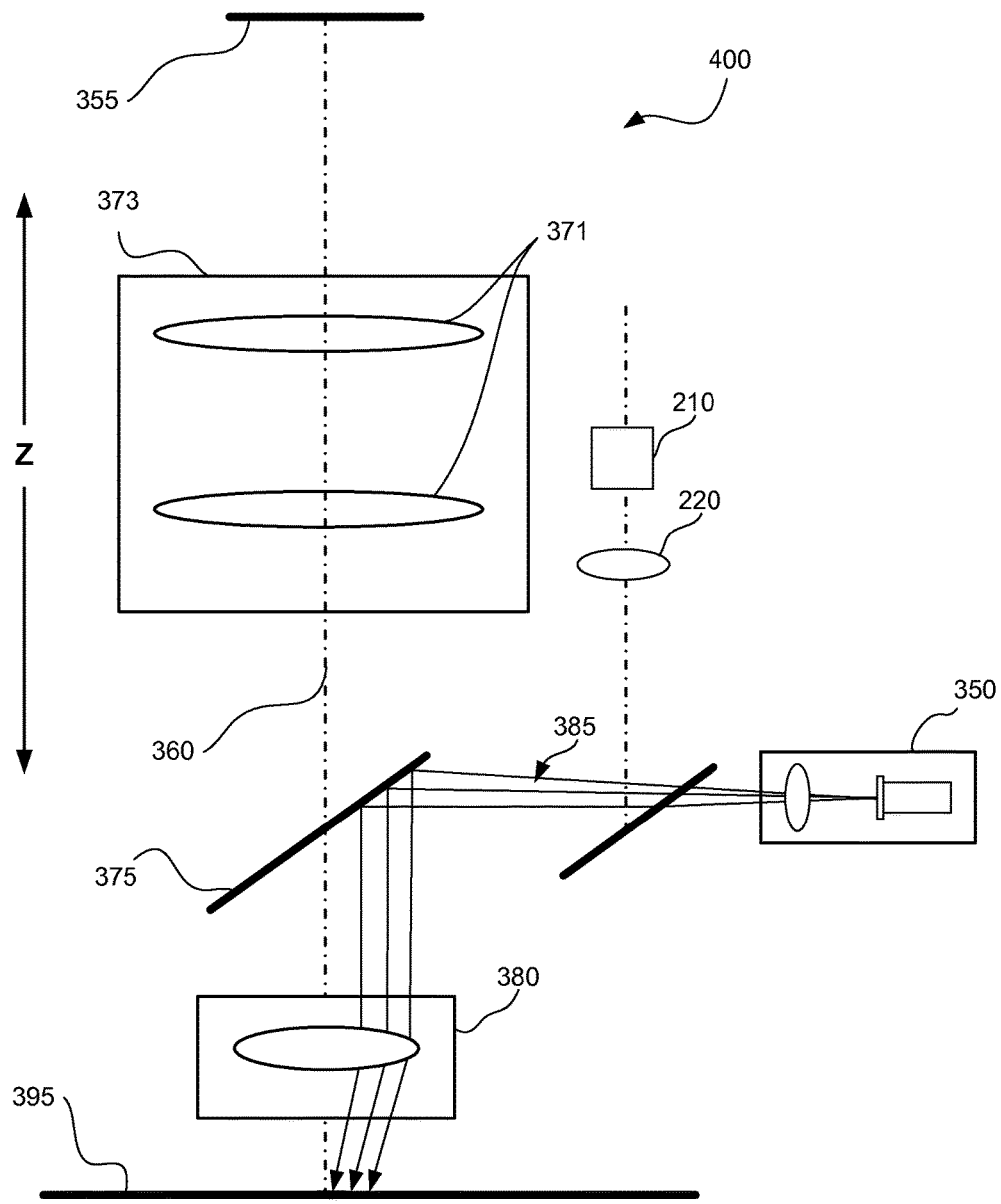
FIG. 3 is a simplified schematic illustration of an optical structure for DMS that is integrated with a microscope of an inspection system in accordance with some embodiments of the present invention.

Reference is now made to FIG. 3 showing a simplified schematic illustration of an optical structure for a DMS that is integrated with a microscope of an inspection system in accordance with some embodiments of the present invention. According to some embodiments of the present invention, DMS 300 operates with a microscope camera 400 positioned over a planar surface 395. Typically, an objective lens 380 is separated from imaging optics and/or upper field lenses 373 in a microscope camera. According to some embodiments of the present invention, beam splitter 375 is positioned between field lenses 373 and objective lens 380. According to some embodiments of the present invention, pattern generator 350 projects illumination at right angles to main optical path and objective lens 380 provides for bending rays 385 so that rays 385 reach planar surface 395 at an oblique angle. Optionally, the oblique angle used for a microscope camera is larger than that used for lower magnification cameras, e.g. as described in reference to FIG. 2. Optionally and/or alternatively, pattern generator 350 projects illumination directly toward object lens 380 at an oblique angle. Typically, the illumination is directed to the target area on planar surface 395 and then reflected into the main optical path 360 through imaging optics 373 toward an image sensor 355. Alternatively, illumination from the pattern generator 350 is reflected along an alternate optical path.

Figure 4A:
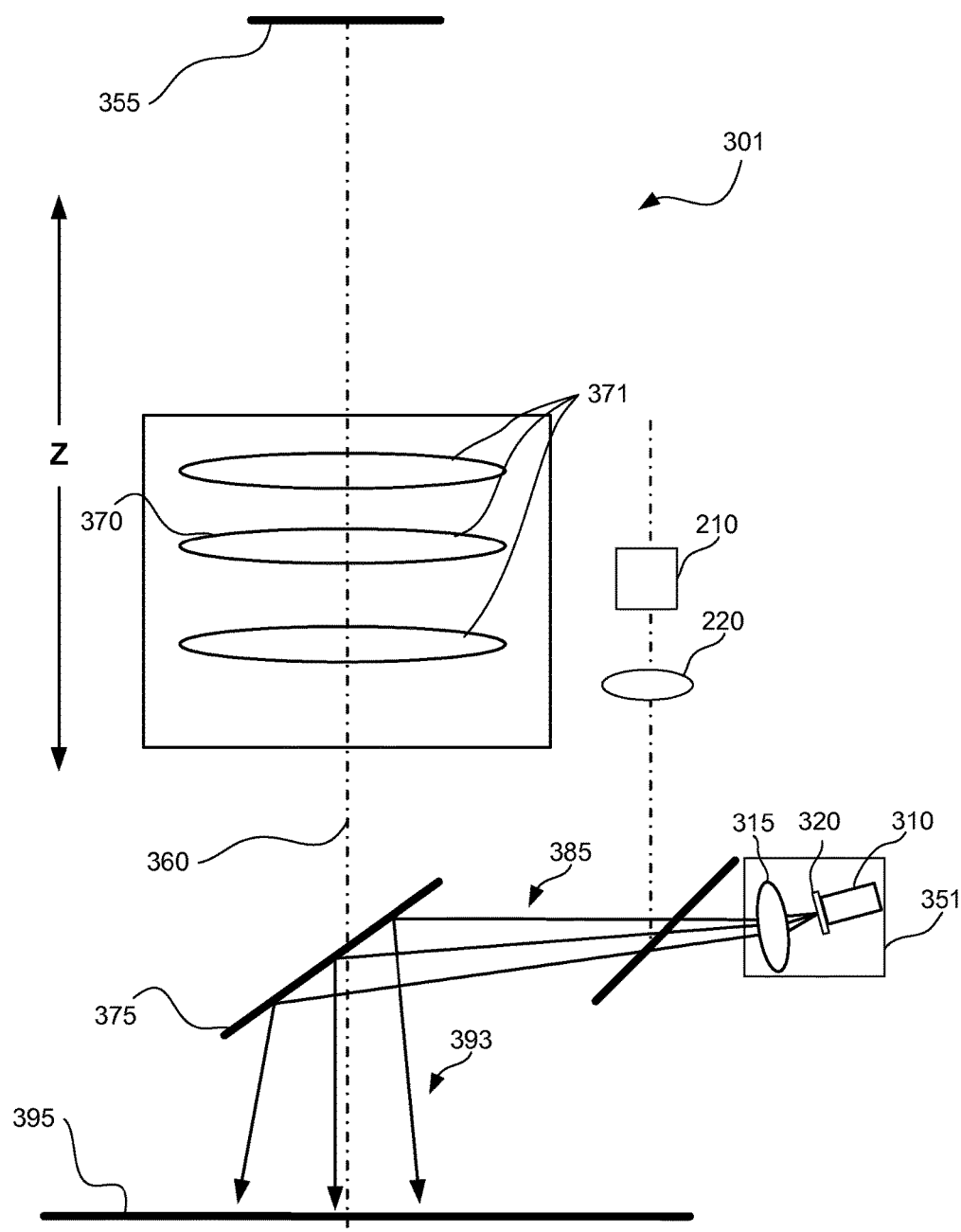
FIGS. 4A and 4B are simplified schematic illustrations of alternative optical structures of DMS that is integrated with a camera of an inspection system in accordance with some embodiments of the present invention.
Figure 4B:
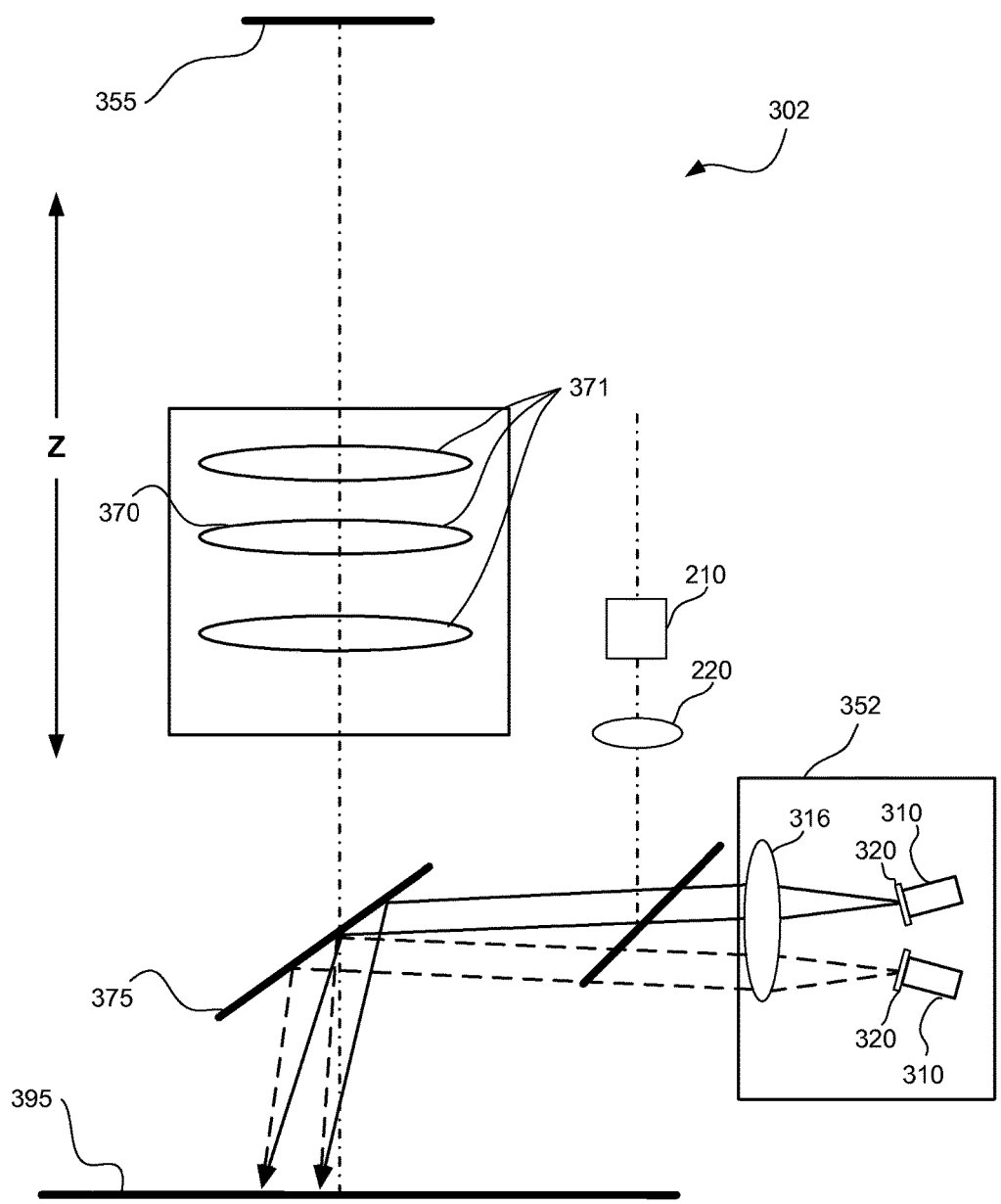

Reference is now made to FIGS. 4A and 4B showing simplified schematic illustrations of alternative optical structures of a DMS that is integrated with a camera of an inspection system in accordance with some embodiments of the present invention. It is noted that although the alternative exemplary optical structures are shown for a camera as described in FIG. 2, a same or similar structure may be applied to a microscope camera as described in FIG. 3. Optionally, more than one alternative can be applied to camera 300 and/or microscope camera 400. Referring now to FIG. 4A, a camera 301 is shown to be integrated with a pattern generator 351 that projects a spatially random auto-focus pattern on planar surface 395 with a zoom effect. Optionally, a distance between laser diode 310 and optics 315 is defined so that rays 385 will be non-parallel when hitting planar surface 395. Optionally, when using a non-parallel projection, the spatially random auto-focus pattern typically changes in a complex fashion responsive to changes in a working distance of camera 301. Optionally, both shift and scaling can be detected and/or tracked for sensing information for focusing.

Referring now to FIG. 4B, a pattern generator 352 may include more than one laser diode 310 and diffuser 320 pair. In some exemplary embodiments pattern generator 352 includes two laser diode 310 and diffuser 320 pairs, each of which project a spatially random auto-focus pattern on planar surface 395. Optionally, both pairs project through a same lens 316. Typically, the two laser diodes 310 are not coherent so that each laser diode 310 can create its own spatially random auto-focus pattern. Optionally, pattern generator 352 includes more than one laser diode 310 illuminating through a same diffuser. Optionally, each laser diode 310 projects illumination at a different angle and generates a unique spatially random pattern. In some exemplary embodiments, pattern generator 352 provides for projecting each spatially random auto-focus pattern on the planar surface at a different angle. In some exemplary embodiments, projecting two spatially random auto-focus patterns from different angles can be used to improve reliability and signal to noise ratio for detecting working distance and/or changes in working distance for auto-focusing.

It is noted that typically the illumination projected from pattern generators 351 and/or 352 is directed to the target area on planar surface 395 and then reflected along main optical path 360 through the imaging optics of the inspection system and toward an image sensor 355. Alternatively, the illumination from the pattern generators 351 and/or 352 is reflected along an alternate optical path optionally leading to the alternate image sensor.

Figure 5:
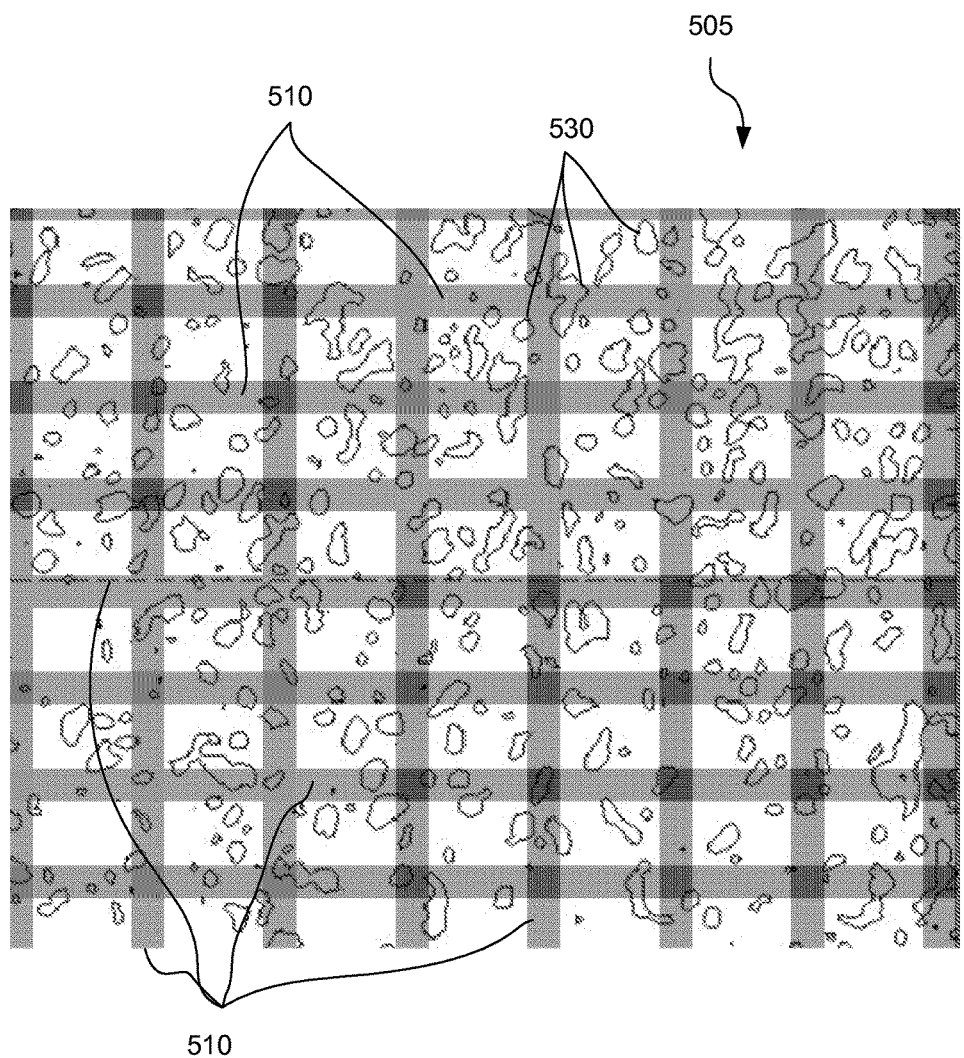
FIG. 5 is an exemplary image of a reflected speckle pattern projected on a patterned surface in accordance to some embodiments of the present invention.

Reference is now made to FIG. 5 showing an exemplary image of a reflected speckle pattern projected on a patterned surface in accordance to some embodiments of the present invention. According to some embodiments of the present invention, an image 500 captured with any one of cameras 300, 301, 302 and/or microscope 400 includes both a patterned 510 etched and/or printed on a panel and a spatially random auto-focus pattern 530 formed from a plurality of speckles. It is noted that a constant intensity contour of speckles is shown in FIG. 5 for clarity purposes. Typically, pattern 510 includes defined geometrical shapes, e.g. rectangles, lines and circles. Typically, spatially random auto-focus pattern 530 has poor correlation with pattern 510 of the panel and therefore spatially random auto-focus pattern 530 is unlikely to be confused with pattern 510 during auto-focusing.

According to some embodiments of the present invention, translation and/or scaling of one or more speckles and/or one or more groups of speckles in auto-focus pattern 530 is tracked and/or detected to determine changes in a working distance of the camera. Typically, accuracy in detection can be improved by performing analysis and a plurality of speckles covering a FOV of the camera. In some exemplary embodiments convolution is used to track movement of the speckle pattern over different working distances. In some exemplary embodiments, coordinates of one or more speckle centers are determined and their position tracked and/or compared with stored coordinates for defined working distances of the camera. Optionally, correlation between the captured speckled pattern and one or more pre-stored images captured at known working distances of the imaging system is calculated to determine a current working distance of the camera. Typically, while performing auto-focusing during a scanning motion of a camera, pattern 510 may typically be smeared in the scanning direction due to movement of the camera with respect to the panel while spatially random auto-focus pattern 530 will remain un-smeared since the pattern generator is integrated with the camera and/or moves together with the camera. It is noted that motion smearing effect is not shown in FIG. 5.

Reference is now made to FIGS. 6A, 6B and 6C showing exemplary graphs of translation and/or scaling of speckle patterns due to a change in the working distance of a camera in accordance with some embodiments of the present invention. Ideally, for an optical structure shown in FIG. 2 and in accordance with some embodiments of the present invention, each of the speckles in speckle pattern 530 will typically translate as shown in FIG. 6A, in substantially a same direction and by substantially a same magnitude in response to a change in the working distance of camera 300. In an ideal situation, the translation may typically occur in some defined direction. In some exemplary embodiments, a speckle pattern formed with a DMS as described in FIG. 4A may ideally move in a zoom out direction as shown in FIG. 6B or in a zoom in direction in response to a change in the working distance of the camera. The present inventor has found that due to inaccuracies in the system and/or due to the simple mechanical construction used that does not require accurate mechanical or calibration procedures, direction of translation and/or scaling of speckle patterns is typically not linear throughout the image and may be similar to the directions as shown in FIG. 6C. Typically movement of the speckle pattern or other spatially random auto-focus pattern may include a combination of changes in both translation and scale in two dimensions. In a case when more than one laser source is used, as shown and discussed for example in reference to FIG. 4B, multiple changes will occur, e.g. the movement of the speckle pattern will be more complex.

Figure 7:
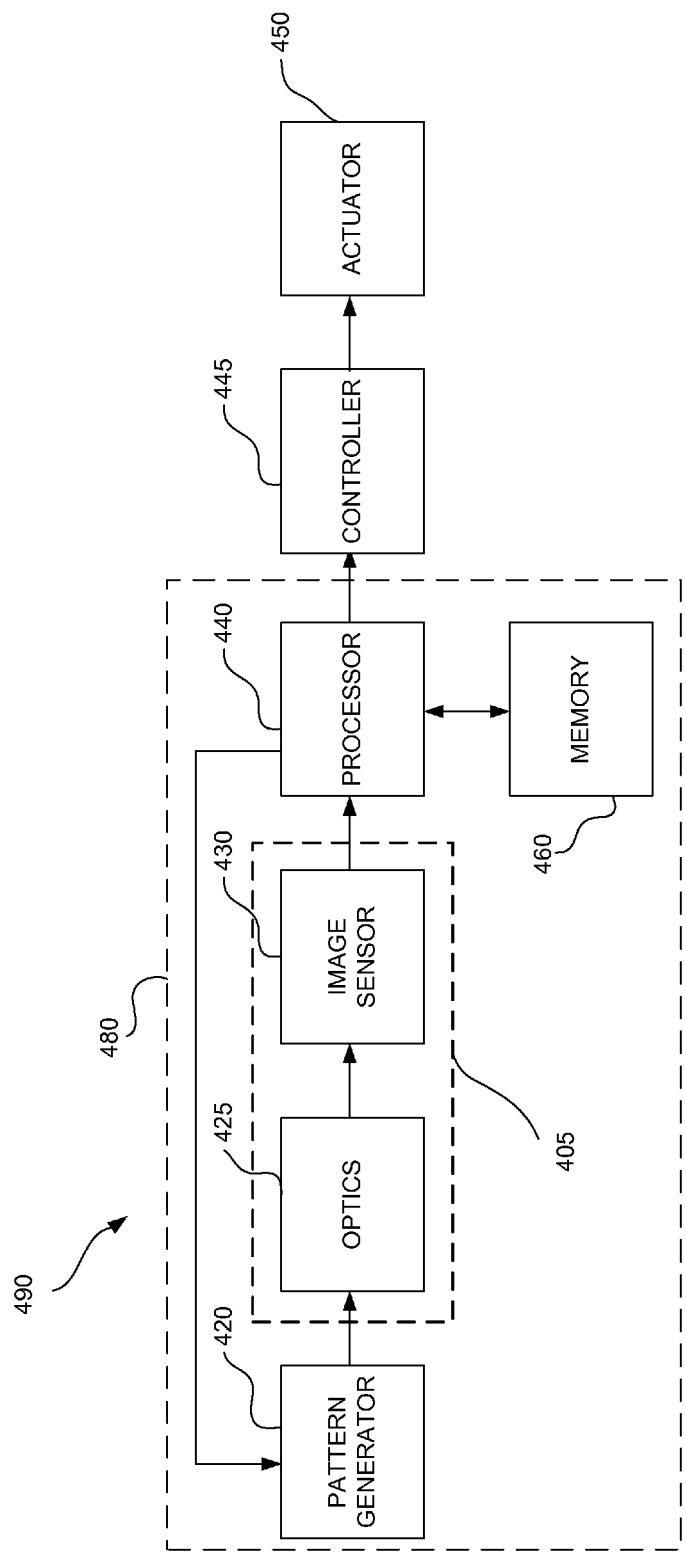
FIG. 7 is a simplified block diagram of exemplary components of an auto-focus system in accordance with some embodiments of the present invention.

Reference is now made to FIG. 7 showing a simplified block diagram of exemplary components of an auto-focus system in accordance with some embodiments of the present invention. According to some embodiments of the present invention, the auto-focus system 490 includes DMS 480, an actuator 450 for moving the camera, e.g. an image sensor and/or associated optics in relation to the planar surface and a controller 445 for controlling position of actuator 445. According to some embodiments of the present invention, DMS 480 includes a pattern generator 420 that generates and projects a spatially random auto-focus pattern on a planar surface for imaging and/or inspecting, a camera 405 for capturing the spatially random auto-focus pattern as reflected from a planar surface and a processor 440 for processing output from camera 405 for determining a deviation from a focused position. Optionally, processor 440 provides instruction to change a location of image sensor 430 in order to change ROI (Region of Interest). Optionally, camera 405 used by DMS 480 is the same camera used to inspect the planar surface. Alternatively camera 405 is a camera dedicated for auto-focusing. Typically, when camera 405 is dedicated for auto-focusing, actuator 450 changes the positions of both camera 405 and the camera used for inspection.

Optionally, pattern generator 420 is selected from one of exemplary pattern generators 350, 351 or 352. In some exemplary embodiments pattern generator 420 generates and projects a speckled pattern on the planar surface. According to some embodiments of the present invention, the pattern generator 420 includes one or more laser diodes and diffusers for generating the speckle pattern.

In some exemplary embodiments, the laser diode is controlled to illuminate at a near IR wavelength and/or a wavelength that can be distinguished from illumination used for inspecting the planar surface. In some exemplary embodiments, the intensity of the laser diode is selected based on a gray level of the planar surface, e.g. by calculating a gray level measure of the image of the planar surface, (e.g. the target) and comparing to a predefined value of a desired gray level measure. Optionally, the gray level measure is an average gray level of an image of the target and the random pattern or some higher percentile, e.g. 95 percentile. Optionally, if the measure is significantly lower or higher than the predefined value of a desired gray level measure, the laser pulse intensity or duration is adjusted accordingly. Optionally, an image is captured between two auto-focusing images to estimate the gray level of the target.

According to some embodiments of the present invention, when inspecting a panel that is transparent, e.g. a glass panel that is patterned, the laser diode is selected to have a low enough coherence to avoid producing an interference pattern due to reflection from both sides of the transparent panel. Optionally, when generating a speckle pattern, the coherence of the laser diode is selected to be high enough to generate a desired speckle but small enough to avoid the interference pattern. Typically, the coherence of an off the self laser diode can be used is suitable for transparent panels with thickness over a few 100 microns.

According to some embodiments of the present invention, the specular reflection of the projected auto-focus pattern is captured by a camera 405 for auto-focusing and camera 405 is used for both imaging the planar surface and for auto-focusing. In some exemplary embodiments, one or more optics 425 and image sensor 430 are components of an imaging system used for imaging and/or inspecting the planar surface. Alternatively, camera 405 is a camera dedicated for auto-focusing and is separate from the camera used for imaging and/or inspecting the planar surface.

Optionally, optics 425 is microscope optics. Optionally, the spatially random auto-focus pattern generated is projected over an entire FOV of camera 405. Alternatively, the spatially random auto-focus pattern generated is projected over a selected portion of the FOV.

In some exemplary embodiments, auto-focus system 490 and/or camera 405 alternates between capturing full images of the planar surfaces and capturing auto-focus images of the spatially random auto-focus pattern, e.g. auto-focus images. Optionally, smaller images are used for capturing the spatially random auto-focus pattern, e.g. by selecting to use a region of interest smaller than the full frame, e.g. 100 rows out of 2000 rows, to reduce the time it takes to capture and process the images of the spatially random auto-focus pattern. According to some embodiments of the present invention, during a scanning procedure, camera 405 periodically captures an auto-focus image after one or more full images and adjusts its working distance based on analysis of the auto-focus image. Alternatively, camera 405 captures images of the planar surface combined with the reflection of the spatially random auto-focus pattern and during scanning. Optionally, in such cases the spatially random auto-focus pattern is projected over a selected portion of the FOV. Optionally, the spatially random auto-focus pattern is projected over a portion of the FOV that is overlapped with other captures during the scanning procedure, so that the portion is imaged once with the spatially random auto-focus pattern and once with the regular uniform illumination.

In some exemplary embodiments, camera 405 is used to capture images at a plurality of requested coordinates. Optionally, for such cases, camera 405 captures a plurality of auto-focus images as it moves from one coordinate to the next so that it reaches a requested coordinate in focus. Optionally, the auto-focus images are defined to be smaller than the images used for inspection in order to enable a fast AF capturing rate and bandwidth.

According to some embodiments of the present invention, image data captured by camera 405 is received and analyzed by a processing unit 440 to determine a working distance of camera 405 and/or an offset of the working distance from a focus and/or nominal working distance. In some exemplary embodiments, analysis is based on comparing and/or correlating images captured by image detector 360 to one or more images stored in a memory 460. Optionally, memory 460 stores a model that defines a relationship between a working distance of camera 405 and positioning of the projected auto-focus pattern on the images captured.

According to some embodiments of the present invention, processing unit 440 pre-processes the image to reduce the energy of the object pattern, e.g. the pattern printed and/or etched on the planar surface in relation to that of the spatially random auto-focus pattern. In some exemplary embodiments, a band pass filter that is optionally matched with a known frequency range of the spatially random auto-focus pattern is used to increase the contrast of the spatially random auto-focus pattern against the pattern printed and/or etched on the planar surface. Typically, a band pass filter can be used since the highest frequencies in the captured images are associated with edges of patterns on the panel and the lowest frequencies are associated with pattern itself which is typically uniform between the edges. Optionally, smearing of the image during a scanning procedure adds contrast to the un-smeared spatially random auto-focus pattern relative to the smeared pattern on the substrate. Typically, the smearing only appears in the scanning direction.

According to some embodiments of the present invention, output from processor 440 is used by controller 445 for activating an actuator 450 to adjust the working distance of the camera of the inspection and/or imaging system. Typically, the auto-focus system is integrated with the camera of the inspection and/or imaging system and actuator 450 adjusts position of camera 405 together with auto-focus system and/or parts thereof. Typically, pattern generator 420, camera 405, processor 440 and memory 460 together make up the DMS. Optionally, in some high precision cases, the controller actuator will be connected in a closed control loop.

Figure 8:
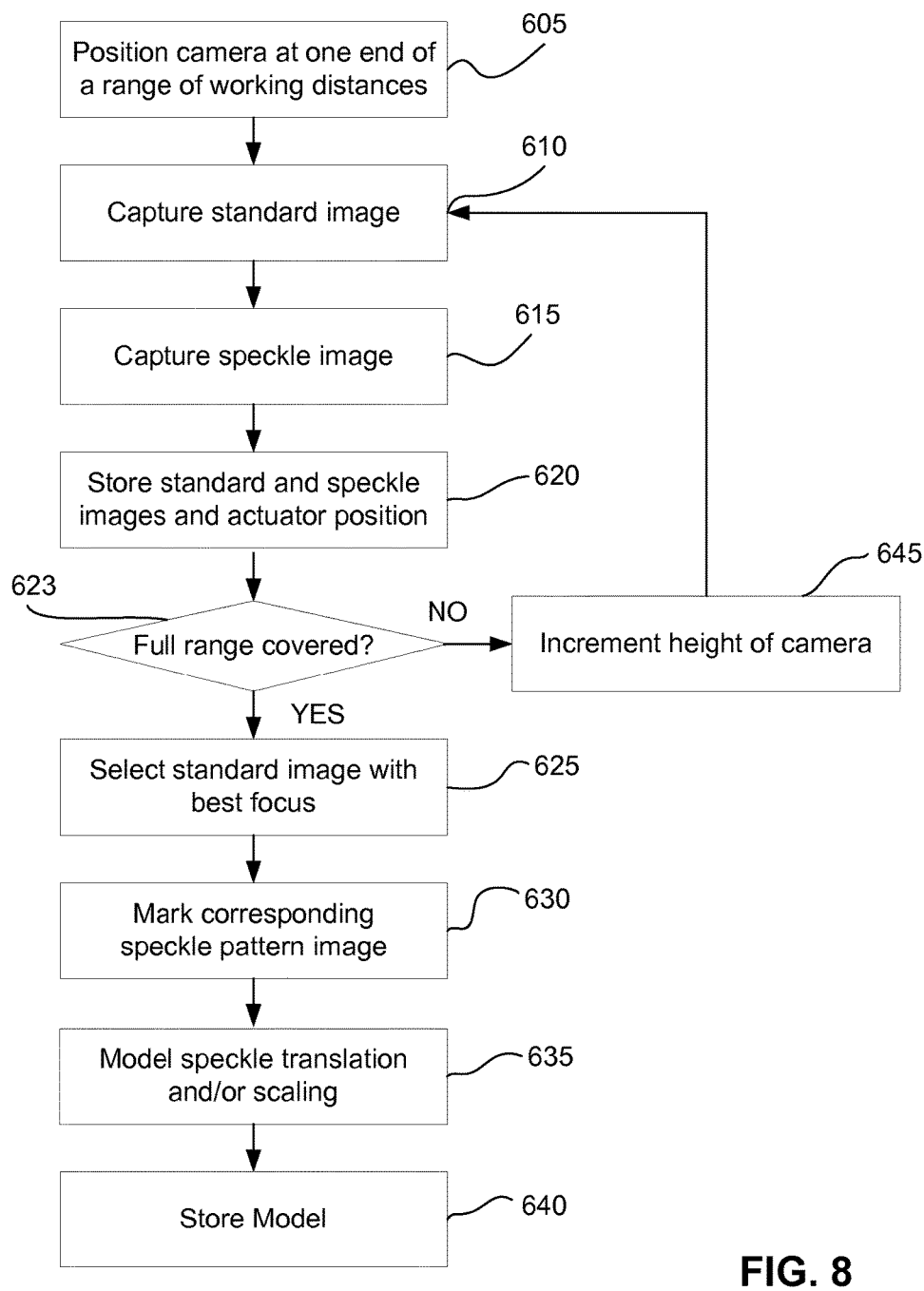
FIG. 8 is a simplified flow chart of an exemplary method for calibrating an auto-focus system, in accordance with some embodiments of the present invention.

Reference is now made to FIG. 8 showing a simplified flow chart of an exemplary method for calibrating an auto-focus system, in accordance with some embodiments of the present invention. According to some embodiments of the present invention, during a calibration procedure, a camera is positioned at one end of a range of working distances for beginning a calibration process (block 605). According to some embodiments of the present invention, at this position an image of the planar surface, e.g. the standard image is captured (block 610) and an image of the speckle pattern e.g. the speckle image is captured (block 615). According to some embodiments of the present invention, the standard image and the associated speckle image are stored in memory together with reference to a position of an actuator supporting the camera (block 620). According to some embodiments of the present invention, the actuator increments the working distance of the camera (block 645) and the process (block 610, 615, 620) is repeated until standard and speckle images are captured over a range of working distances of the camera (block 623). Optionally, a specific area of the speckle image is identified and stored. According to some embodiments of the present invention, the standard images that were captured are inspected and/or analyzed to select an actuator position that will yield an image with the best focus (block 625). Typically, selecting the actuator position yielding image with the best focus is performed automatically based on defined criteria. Typically, a processor analyzes the images and selects and/or suggests an actuator position that will yield an image with the best focus. According to some embodiments of the present invention, the speckle image that is associated with the standard image having the best focus is marked together with its associated actuator position (block 630). Optionally, the actuator position associated with each of the other speckle images is updated to include distance away from the actuator position associated with the selected image. According to some embodiments of the present invention, during auto-focusing, an auto-focus image is correlated with the speckle images captured during calibration. Typically, a distance away from the desired actuator position is determined by matching the speckle image with one of the speckle images captured during a calibration procedure (at a certain actuator position) that provides the best correlation between the two images. Optionally, values of a few correlations near the maximum correlated image are used to define a smooth function, e.g. a parabola and a maximum value of the function is used as the desired actuator position. Optionally, one or more parameters are defined and used to determine a model that can be used to determine distance and direction away from a desired actuator position (block 635). In some exemplary embodiments, coordinates of one or more speckle peak centers are determined. Optionally, the model and/or parameters are stored in memory and used during auto-focusing (block 640).

Figure 9:
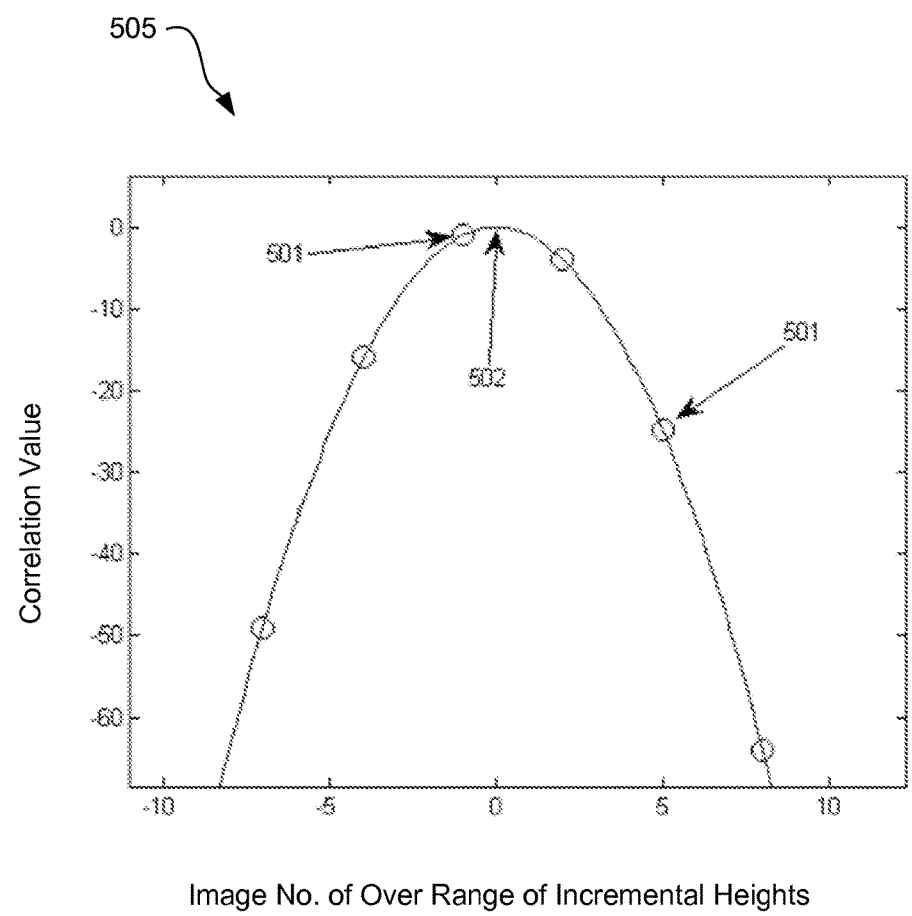
FIG. 9 is a simplified graph of exemplary correlation values between images captured during auto-focusing and calibration images stored in memory in accordance with some embodiments of the present invention.

Reference is now made to FIG. 9 showing a simplified graph of exemplary correlation values between images captured during auto-focusing and calibration images stored in memory in accordance with some embodiments of the present invention. According to some embodiments of the present invention, during inspection, an image of a reflected spatially random auto-focus pattern is correlated with images stored in memory from a calibration procedure. Optionally, correlation is performed with a plurality of calibration images and correlations values 501 are obtained. In some exemplary embodiments, correlation between a captured image and calibration images are determined until a peak correlation 502 is found. Optionally, a working distance of the camera or distance of a camera from a focus working distance is defined based on working distance or actuator positions associated with a calibration image that provides the highest correlation. Optionally, actuator position associated with the maximal correlation is compared with a target actuator position saved during calibration and the difference in position is reported to the controller. Optionally, the distance to the target actuator position is defined using a model that calculates the distance from the current captured image to the calibration image captured at the target actuator position.

Figure 10:
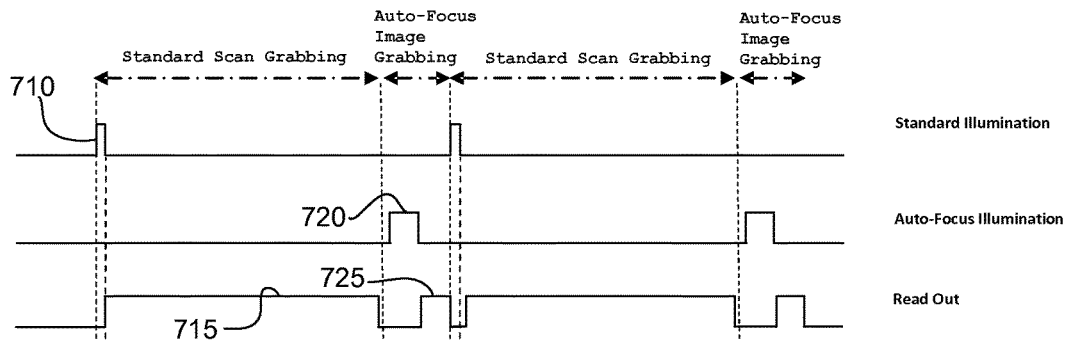
FIG. 10 is a simplified time line for alternating between operating a DMS and capturing images for scanning a planar object in accordance with some embodiments of the present invention.

Reference is now made to FIG. 10 showing a simplified time line for alternating between operating a DMS and capturing images for scanning a planar object in accordance with some embodiments of the present invention. According to some embodiments of the present invention, an auto-focus system is used for focusing a camera, e.g. each of cameras 128 (FIG. 1) while the camera scans a planar surface. Typically, during scanning there is relative motion between the camera and the target surface. Typically, while grabbing images of the target surface, the camera applies standard illumination, e.g. in the visible light range over a fast illumination pulse 710 to freeze the scanning motion. Typically, a shutter of the camera shutter is opened in coordination with the illumination pulse 710 and pixels of the camera are illuminated. Typically, timing for subsequent image grabbing is limited by a readout time 715 of the camera. According to some embodiments of the present invention, an auto-focus image is captured between image grabbing during scanning. According to some embodiments of the present invention, the camera and/or DMS provide auto-focus illumination pulse 720, e.g. with pattern generator 350, 351 or 352 for capturing an auto-focus image. In some exemplary embodiments, auto-focus illumination pulse 720 has a longer duration than standard illumination pulse 710. Typically, the longer duration pulse 720 provides smearing of an image during scanning which is typically desirable while capturing an auto-focus image. Typically, motion smearing increases the contrast between the spatially random auto-focus pattern and the pattern printed and/or etched on the planar surface. Typically, although the image of the planar surface is smeared, the spatially random auto-focus pattern generated by the pattern generator remains un-smeared, e.g. focused since the pattern generator moves together with the camera. According to some embodiments of the present invention, the camera is programmed to use a smaller region of interest (ROI) for capturing auto-focus images so that the readout time 725 for of the camera for auto-focusing is significantly shorter than the readout time 715 for obtaining data for a standard image. Typically, the smaller frame used for the auto-focus image is sufficient for auto-focusing and the reduced readout time provides for improving the efficiency of the inspection system. In some exemplary embodiments, one auto-focus image is captured for each standard image during scanning. Alternatively, an auto-focus image is captured once for every plurality of standard images captured.

Figure 11:
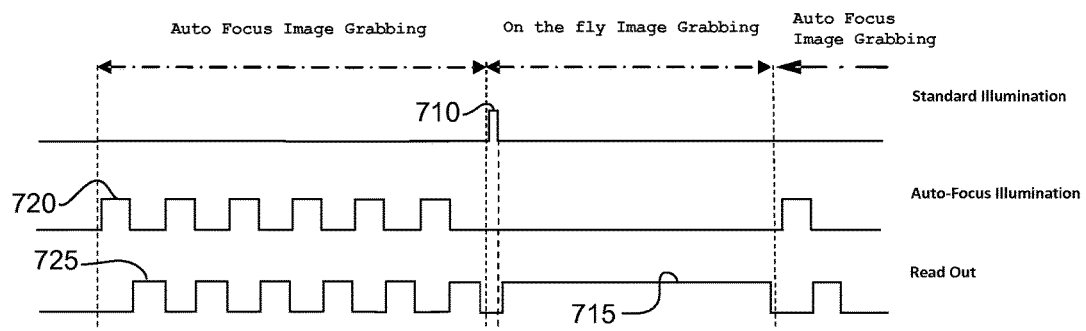
FIG. 11 is a simplified time line for operating a DMS for capturing images of a plurality of discrete areas on a planar object in accordance with some embodiments of the present invention.

Reference is now made to FIG. 11 showing a simplified time line for operating a DMS for capturing images of a plurality of discrete areas on a planar object in accordance with some embodiments of the present invention. According to some embodiments of the present invention, the auto-focus system is used for focusing a camera that captures images at a plurality of defined coordinates of the planar surface, e.g. camera 132 (FIG. 1). Images at the defined coordinates can be taken on-the-fly or by stopping the camera at each defined coordinate. According to some embodiments of the present invention, delays in moving from one coordinate to then next due is avoided by performing auto-focusing on-the-fly while moving to the new coordinate. Typically, this method provides for reaching a desired coordinate with the camera already in focus. According to some embodiments of the present invention, while the camera is moving to a desired location, one or more auto-focus images are captured by providing auto-focus illumination pulses 720, opening the shutter of the camera and/or illuminating that pixels of the image sensor, and taking a readout 725 response to each illumination pulse 720. Typically, a small ROI is defined for the auto-focus images. Optionally, once the camera reaches the desired coordinates, the camera initiates a standard illumination pulse 710 and typically captures a full image of the FOV over a readout time 715. Typically, readout time for a full image takes approximately 1-4 msec, e.g. 2 msec while a readout time for an auto-focus image is significantly less, e.g. less than 50-200 μsec.

Figure 12:
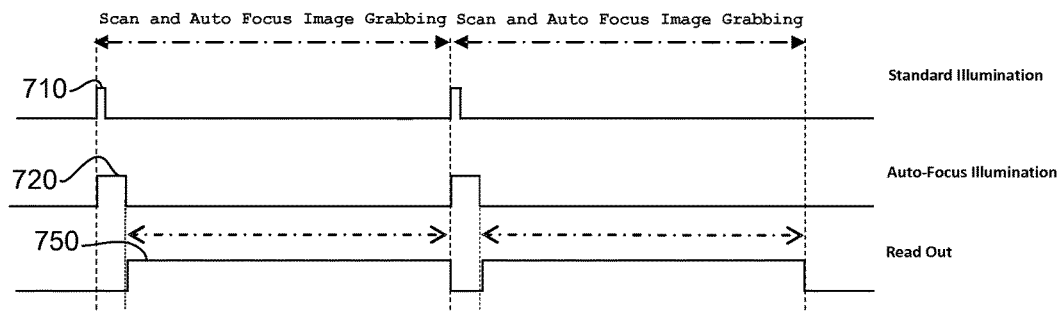
FIG. 12 is a simplified time line for operating a DMS and scanning a planar object with the same images in accordance with some embodiments of the present invention.

Reference is now made to FIG. 12 showing a simplified time line for operating a DMS and scanning a planar object with the same images in accordance with some embodiments of the present invention. According to some embodiments of the present invention, image grabbing of the target object and auto-focus image grabbing is not separated by time and a same image is used for inspecting the planar surface and providing auto-focus sensing for the camera. In some exemplary embodiments, when an object image is also used as an auto-focus image, the camera provides both standard illumination pulse 710 and auto-focus illumination pulse 720. Typically, standard illumination pulse 710 and an auto-focus illumination pulse 720 overlap in time. Optionally, when the standard illumination pulse 710 and the auto-focus illumination pulse 720 overlap in time, an algorithm is used to separate the auto-focus pattern from the object pattern. Optionally, the algorithm uses known information regarding the patterns. Optionally, auto-focus illumination pulse 720 is provided over a longer duration as compared to standard illumination pulse. Typically, when lengthening the duration of the auto-focus illumination pulse 720, the object pattern is smeared due to the scan motion and the contrast of the auto-focus pattern against the object pattern is improved. Optionally, the auto-focus image and the standard image are captured using two different sensors or cameras.

In some exemplary embodiments, the camera alternates between only illuminating with standard illumination pulse 710 and illuminating with both standard illumination pulse 710 and auto-focus illumination pulse 720. Typically, during scanning there is large overlap between images. Optionally, the overlapping image that does not include the auto-focus pattern is compared to the overlapping image that includes the auto-focus pattern and this comparison provides for separating the patterns. In some exemplary embodiments, separation is by gray level processing, e.g. a gray level is dedicated to the spatially random auto-focus pattern.

According to some embodiments of the present invention, the spatially random auto-focus pattern projected with auto-focus illumination pulse 720 is directed to an area of the FOV corresponding to a plurality of rows that are dedicated for detecting the spatially random auto-focus pattern. In this manner, the region of the FOV that is illuminated by the auto-focus pattern is not illuminated by the standard illumination. The spatial separation between the different illuminations may provide for improving contrast of the speckles. In some exemplary embodiments, the dedicated rows correspond to a portion of an image area, e.g. a sub-slice of an image area perpendicular to a scan direction that is imaged more than once over the scan, e.g. once with the spatially random auto-focus pattern and at least once more without the spatially random auto-focus pattern. According to some embodiments of the present invention, a full readout 750 is obtained for each image captured.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A distance measuring system for auto focusing a camera of an inspection system for inspecting a planar surface that includes a patterned object, the distance measuring system comprising:
    a pattern generator that generates a spatially random pattern and projects the spatially random pattern toward the planar surface at an oblique angle;
    an image sensor that captures an image of the spatially random pattern reflected off the planar surface;
    at least one optical element that forms the image of the reflected pattern on the image sensor; and
    a processor that obtains distance information between the image sensor and the planar surface based on at least one of shifting and scaling of at least one feature of the spatially random pattern, and that provides auto-focus information based on the distance information,
    wherein the pattern generator is configured to project the spatially random pattern such that the shifting or scaling of the projected spatially random pattern captured in the image changes non-linearly in response to different distances between the image sensor and the planar surface,
    wherein the processor detects the nonlinear changes of the shifting or scaling of the spatially random pattern in the image and determines changes in distance between the image sensor and the planar surface using the nonlinear changes to determine the auto-focus information, and
    wherein the spatially random pattern is uncorrelated with the pattern of the patterned object.

2. The system according to claim 1, wherein the pattern generator includes a laser diode that illuminates in a light range that is other than a range used for inspecting the planar surface.

3. The system according to claim 1, wherein the pattern generator includes an illuminator that provides a coherent light beam and a diffuser for generating the spatially random pattern.

4. The system according to claim 3, wherein the pattern generator includes at least one lens through which the spatially random pattern is projected and wherein distance between the illuminator with the diffuser and the at least one lens is defined to yield divergence of the rays that are projected onto the planar surface.

5. The system according to claim 1, wherein the pattern generator includes more than one coherent illumination source, each source generating a unique spatially random pattern.

6. The system according to claim 5, wherein each coherent illumination source illuminates through a dedicated diffuser.

7. The system according to claim 5, wherein each illuminator projects at a different angle.

8. The system according to claim 1, wherein the pattern generator is configured to generate a speckle pattern.

9. The system according to claim 1, wherein the pattern generator projects the spatially random pattern over an area larger than a field of view of the image sensor.

10. The system according to claim 1, wherein the at least one optical element is the imaging optics used for capturing images of the planar surface for inspection.

11. The system according to claim 1, wherein the at least one optical element includes microscope optics and wherein the pattern generator projects the spatially random pattern toward the planar surface through an objective lens of the microscope optics.

12. The system according to claim 1, wherein the image sensor captures the image of the spatially random pattern in a region of interest mode.

13. The system according to claim 12, wherein the image sensor switches from capturing the image of the spatially random pattern in a region of interest mode to capturing a second image for inspection of the planar surface in a full frame mode, wherein the image captured in the region of interest mode is smaller than the image captured in the full frame mode.

14. The system according to claim 1, wherein the pattern generator includes a laser beam source and a holographic mask.

15. The system according to claim 1, wherein the non-linear changes of the projected spatially random pattern includes non-uniform scaling or non-uniform translation of the spatially random pattern in the image in response to different distances between the image sensor and the planar surface.

16. A distance measuring system for auto focusing a camera of an inspection system for inspecting a planar surface that includes a patterned object, the distance measuring system comprising:
    a pattern generator that generates a spatially random pattern and projects the spatially random pattern toward the planar surface at an oblique angle;
    an image sensor that captures an image of the spatially random pattern reflected off the planar surface;
    at least one optical element that forms the image of the reflected pattern on the image sensor;
    a processor that processes the image of the spatially random pattern captured by the image sensor and provides auto-focus information based on at least one of shifting and scaling of at least one feature of the spatially-random pattern; and
    a memory for storing at least one calibration image of the spatially random pattern reflected off the planar surface, wherein the processor performs correlation between the image of the spatially random pattern and the calibration image of the spatially random pattern,
    wherein the pattern generator is configured to project the spatially random pattern such that the shifting or scaling of the projected spatially random pattern captured in the image changes non-linearly in response to different distances between the image sensor and the planar surface, wherein the processor detects the nonlinear changes of the shifting or scaling of the spatially random pattern in the image and determines changes in distance between the image sensor and the planar surface using the nonlinear changes to determine the auto-focus information, and wherein the spatially random pattern is uncorrelated with the pattern of the patterned object.

17. The system according to claim 16, wherein the nonlinear changes of the projected spatially random pattern includes non-uniform scaling or non-uniform of the spatially random pattern in the image in response to different distances between the image sensor and the planar surface.

18. An auto-focus system for auto focusing a camera of an inspection system with respect to a planar surface having a patterned object for inspection comprises:
  a pattern generator that generates a spatially random pattern and projects the pattern generated toward a planar surface at an oblique angle;
  a camera that captures an image of the spatially random pattern reflected off the planar surface;
  a processor that obtains distance information between the image sensor and the planar surface based on at least one of shifting and scaling of at least one feature of the spatially random pattern, and that provides auto-focus information based on the distance information;
  an actuator for changing a working distance between the camera and the planar surface; and
  a controller that controls operation of the actuator in response to the auto-focus information provided by the processor,
  wherein the pattern generator is configured to project the spatially random pattern such that the shifting or scaling of the projected spatially random pattern captured in the image changes non-linearly in response to different distances between the image sensor and the planar surface,
  wherein the processor detects the nonlinear changes of the shifting or scaling of the spatially random pattern in the image and determines changes in distance between the image sensor and the planar surface using the nonlinear changes to determine the auto-focus information, and
  wherein the spatially random pattern is uncorrelated with the pattern of the patterned object.

19. The system according to claim 18, wherein the pattern generator includes a laser diode that illuminates in a light range that is other than a range used for inspecting the planar surface.

20. The system according to claim 18, wherein the pattern generator includes an illuminator that provides a coherent light beam and a diffuser for generating the spatially random pattern.

21. The system according to claim 18, wherein the processor provides a distance and a direction toward a desired actuator position.

22. The system according to claim 18, wherein the camera captures the image of the spatially random pattern in a region of interest mode.

23. The system according to claim 18, wherein the nonlinear changes of the projected spatially random pattern includes non-uniform scaling or non-uniform of the spatially random pattern in the image in response to different distances between the image sensor and the planar surface.

24. An auto-focus system for auto focusing a camera of an inspection system with respect to a planar surface having a patterned object for inspection comprises:
  a pattern generator that generates a spatially random pattern and projects the pattern generated toward a planar surface at an oblique angle;
  a camera that captures an image of the spatially random pattern reflected off the planar surface;
  a processor that processes the image of the spatially random pattern captured by the camera and provides auto-focus information based on at least one of shifting and scaling of at least one feature of the spatially-random pattern; and
  a memory for storing at least one calibration image of the spatially random pattern reflected off the planar surface at a known actuator position, wherein the processor performs correlation between the image of the spatially random pattern and the calibration image of the spatially random pattern,
  wherein the pattern generator is configured to project the spatially random pattern such that the shifting or scaling of the projected spatially random pattern captured in the image changes non-linearly in response to different distances between the image sensor and the planar surface,
  wherein the processor detects the nonlinear changes of the shifting or scaling of the spatially random pattern in the image and determines changes in distance between the image sensor and the planar surface using the nonlinear changes to determine the auto-focus information, and
  wherein the spatially random pattern is uncorrelated with the pattern of the patterned object.

25. The system according to claim 24, wherein the nonlinear changes of the projected spatially random pattern includes non-uniform scaling or non-uniform of the spatially random pattern in the image in response to different distances between the image sensor and the planar surface.

* * * * *